No. 639,400. Patented Dec. 19, 1899.
E. KEMPSHALL.
CUSHIONED PNEUMATIC VEHICLE TIRE.
(Application filed June 27, 1899.)
(No Model.)
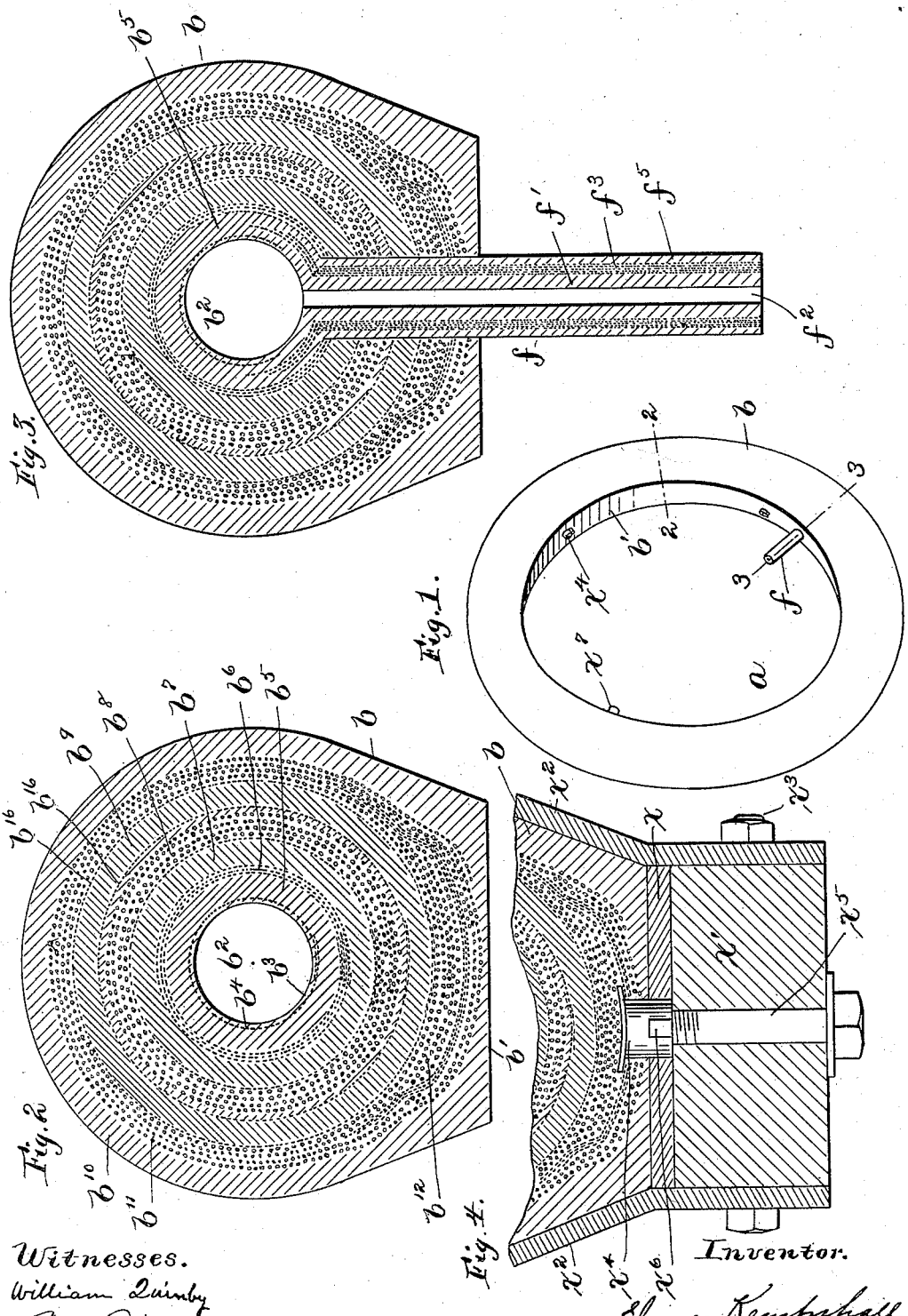
Witnesses.
William Quimby
R. M. Pierson
Inventor.
Eleazer Kempshall
THE NORRIS PETERS CO., PHOTO-LITHO., WASHINGTON, D. C.

UNITED STATES PATENT OFFICE.

ELEAZER KEMPSHALL, OF NEWTON, MASSACHUSETTS, ASSIGNOR, BY MESNE ASSIGNMENTS, TO THE RUBBER TIRE COMPANY OF AMERICA, OF NEW YORK, N. Y.

CUSHIONED PNEUMATIC VEHICLE-TIRE.

SPECIFICATION forming part of Letters Patent No. 639,400, dated December 19, 1899.

Application filed June 27, 1899. Serial No. 722,024. (No model.)

*To all whom it may concern:*

Be it known that I, ELEAZER KEMPSHALL, of Newton, in the county of Middlesex and State of Massachusetts, have invented certain new and useful Improvements in Cushioned Pneumatic Automobile-Tires, of which the following is a specification.

This invention has for its object the production of a cushioned pneumatic tire for heavy vehicles; and it consists of the novel features of construction and relative arrangement of parts hereinafter fully described in the specification, clearly illustrated in the drawings, and particularly pointed out in the claims.

Figure 1 is a perspective view showing my cushioned pneumatic tire. Fig. 2 represents a cross-section of the tire on the line 2 2 of Fig. 1. Fig. 3 represents a cross-section of the tire on the line 3 3 of Fig. 1, showing the air-tube, the valve-stem, and the arrangement of their parts. Fig. 4 is a detailed cross-sectional view of a portion of the tire, on a large scale, showing the location and arrangement of the plies composing the fabric tubes and the manner of securing the tire in place on a wheel-rim.

Referring to the drawings, $a$ represents a tire constructed in accordance with my invention. As shown, said tire is composed of the tube $b$ and the valve-stem $f$, the latter forming an integral extension of the former. The tire, as shown, has a general oval shape in cross-section and a flat inner face $b'$, adapted to fit upon the flat iron tire $x$ of the wheel-rim $x'$.

$x^2$ represents flanges secured to the rim $x'$ of the wheel by bolts $x^3$.

$x^4$ represents lugs secured to or built into the inner face of the tire. These lugs $x^4$ are centrally apertured to receive a bolt $x^5$, which passes through the rim of the wheel, and thus binds the tire to the rim. Said lugs are also provided with a lateral extension $x^6$, that fits in a corresponding recess in the iron tire $x$. The extension $x^6$ prevents the lug $x^4$ from being twisted by the bolt. In practice the iron tire $x$ and the wood rim $x'$ are bored suitably to receive the lugs $x^4$, with their extension $x^6$, the said lug, being of sufficient length to pass into the iron tire $x$; but there is no occasion for its passing into the wood rim $x'$. Instead of said lugs I may employ projections $x^7$, of rubber, made to fit in corresponding recesses of the rim of the wheel. These lugs, while a useful adjunct, are not indispensable and may be omitted, if desired, the purpose of the lugs being simply to prevent creeping.

In placing my tire on the wheel one of the plates $x^2$ is removed, the tire is sprung upon the rim, and the plate $x^2$ replaced and fastened. In placing the tire on the rim care is taken to have the lugs, when such are employed, register with the holes of the rim. After the tire is in the position just described the bolts $x^5$ are inserted and the tire inflated. By this construction it will be seen that the tire is firmly secured in place, the broad flat face of the tire resisting any force tending to rock the tire out of its seat, while the flanges $x^2$ resist any force tending to slide the tire out of its seat. The location of the lugs, when lugs are employed at the point I have indicated—to wit, at the middle of the inner face—reduces to a minimum the strain of these lugs on the tire, since there is the least possible motion of the tire at the center of its inner face.

The tube $b$, referring to Figs. 2 and 4, is shown as made up of a series of superimposed plies of fabric and rubber, and in a word comprises an interior member or air-chamber, an exterior envelop, and a compound cushion of rubber that is arranged between the air-chamber and the exterior envelop. The air-chamber is represented by $b^2$ and is composed of an inner motion-absorbing rubber cushion and an outer motion-absorbing rubber cushion, said cushions being separated by a tube composed of plies of fabric and rubber.

$b^3$ is a tube of rubber forming the inner lining of the air-chamber. $b^4$ is a layer of thin fabric surrounding the rubber $b^3$. $b^5$ is a tube of rubber superimposed and connected to the fabric tube $b^4$. $b^6$ represents a multiple-ply tube of fabric superimposed upon the rubber tube $b^5$. The tubes $b^3$ $b^4$ $b^5$ $b^6$ form one member of the tire and together constitute the wall of the air-chamber $b^2$.

The rubber tube $b^5$ is, as shown, extended to form the core $f'$ of the valve-stem, said core having an air-passage $f^2$, that communicates with the air-chamber $b^2$. The core $f'$ is backed up and surrounded by a multiple tube of fabric $f^3$, one or more of the plies of the fabric tube $f^3$ being extended for an appreciable distance into and anchored to the material of the tube $b^5$.

$f^5$ represents a facing of rubber applied to the fabric tube $f^3$, said facing constituting an extension of the tube $b^5$ and being integral with and connected to the superimposed parts of the structure hereinafter described.

The air-chamber $b^2$ is relatively small, being ordinarily only about an inch in diameter. These chambers are required to carry a large air-pressure, varying from one hundred to one hundred and fifty pounds to the square inch. Making the chamber small reduces materially the proportion of chances of bad places in the wall of the air-chamber, and by providing said air-chamber with a relatively rigid backing of fabric I avoid one of the principal defects that has caused the bursting of air-chambers heretofore—that is to say, prior to my invention the rubber tubes of the air-chamber had not been provided with a fabric backing, so that weak spots in the tube were immediately pressed out by the air-chamber in the form of nipples, the whole pressure practically concentrating at that point and causing the bursting of the tube. By my invention the chance of defective places in the tube is greatly reduced, and at the same time I form about the tube a supporting-backing of fabric that limits the outward movement of the tube to a predetermined surface and prevents the air from forcing the material of the tube beyond a predetermined point, so that I am enabled to subject these tubes to great pressure, the strain of the pressure being resisted by the fabric backing and the rubber being permitted to do only its proper work—that is to say, resist the passage of the air. The fabric backing $f^3$ of the stem protects the core $f'$ of the latter from strains due to the pressure of the air upon the valves secured to the end of the stem in the usual way, said pressure in the class of tires described resulting in a pull on the air-tube in the vicinity of four pounds. This continual pull of the air on the valve-stem soon separates it from the tube and causes leaks. The fabric backing, as shown, is extended down to the interior of the tube and anchored in the interior of the rubber tube $b^5$, while the rubber facing $f^5$ of the valve constitutes a continuation of the material of the tube $b^5$ and of the outer rubber tubes hereinafter described, the said rubber being bound and vulcanized together. It results from this construction that any strain upon the valve-stem is borne by the fabric backing $f^3$, thus leaving the wall of the air-chamber $f^2$ free and in condition to do its proper work—to wit, to stop the passage of air.

By my invention the air-tube, the valve-stem, as well as the rest of the tire, are built together of green stock and vulcanized into an integral structure instead of being made and vulcanized separately, as heretofore.

The outer inclosing envelop of the tire comprises a facing $b^{10}$, connected to and vulcanized upon a heavy fabric backing $b^{11}$, composed of a plurality of plies. Preferably the fabric of this backing is of duck. The several plies of this fabric are wound about the tube and the ends joined or spliced on the inner side of the tube, thus keeping the exterior or wear side of the tube of uniform strength. The inner face of the facing $b^{10}$ is formed flat, as at $b'$. In order to rest upon the wheel-rim, one or more extra short pieces of fabric $b^{12}$ are built in the tire on its inner face between the layers of the tube $b^{11}$, which adds somewhat to the strength of the tire and also assists in the construction of the flat face of the tire.

$b^7$, $b^8$, and $b^9$ constitute a compound cushion interposed between and connected to the opposing faces of the fabric backing $b^{11}$ and $b^6$. This compound cushion is composed of a multiple-ply tube $b^8$ of heavy fabric, such as duck, a motion-absorbing tube or cushion of rubber $b^7$, connected to the inner face of said fabric tube $b^8$, and a motion-absorbing tube or cushion of rubber $b^9$, connected to the outer face of said fabric tube $b^8$.

In constructing the tire a piece of thin fabric is formed to the surface of tube $b^7$ in order to enable the tube to the more readily vulcanize with the fabric tube $b^8$. Also the fabric tube $b^8$ is preferably covered with a coating of thin rubber, and a layer of thin fabric $b^{16}$ is put on each face of the tube $b^9$ before vulcanization in order to the more readily and securely bring about the union of the rubber of the several parts of the tube to the tire. It will be noted that the stem in addition to being secured to the parts of the air-chamber is also securely bound to the tubes $b^7$, $b^8$, $b^9$, $b^{10}$, and $b^{11}$.

In making my improved cushion pneumatic tires for vehicles such as shown it is preferable to subject the same to two or three vulcanizations, since the tire when complete is so thick that it is impracticable to vulcanize it as a whole. The successive vulcanizations may take place at any of the varying stages of the construction of the tire, depending upon the material employed. For best results I have found it better to build the tire, including the stem, up as far as the tube $b^6$ and then to vulcanize such part of the tire, then to continue the construction of the tube up to and including the tube $b^8$, with its rubber facing, and subject the tire at such a stage to a second partial vulcanizing process, and thereafter to apply the remaining tubes $b^9$, $b^{10}$, $b^{11}$, and $b^{16}$ and subject the tire to its last vulcanization process. These several vulcanizations make certain the intimate union of the material of the several tubes; but the number of vulcanizations may be varied; also, the points at which they take place. The fabric composing the tubes $b^4$, $b^6$, and $b^{16}$ is a strong thin kind of cloth treated with rubber in the usual way, while the fabric composing the tubes $b^8$ and $b^{11}$ is heavy duck or canvas treated with rubber. The tubes $b^{11}$ and $b^8$ serve to give the required strength to the tire and also to prevent puncture of the walls of the air-chamber. The compound cushion of rubber not only protects the wheel of the vehicle from injury caused by blows, but also the tubes of the tire from being ruptured or separated by the strain produced by the uses to which the tire is subjected and consisting of both the lateral and longitudinal strains, the effect being to make one tube, as $b^{11}$, slide by or along an inner tube while these strains are acting. The weight carried by bicycles is not sufficient to produce these strains in any destructive amount. When, however, the tires are used for heavy vehicles, such as automobiles, the great weight placed upon the tire and the work required of it increase this strain to such an extent that the plies of the fabric are torn apart. By my invention, however, this defect is overcome, the rubber cushion yielding both laterally and longitudinally to give the tubes the required play and immediately causing them to resume their normal position.

While my invention is particularly adapted for pneumatic tires, yet I do not wish to be understood as limiting my invention to such form, since it may be embraced in vehicle-tires where the central space is filled more or less completely by rubber or other material instead of air. Since in other forms the tire is built up, at least so far as the fabric tubes are concerned, each form is composed of an inner yielding member having a fabric backing, an outer wear member supported upon the fabric backing, and a cushioned tube of rubber arranged between and connected to the outer and inner members. The walls of the tire are of such thickness and are so protected by the canvas tubes that it is practically impossible to puncture the tire far enough to reach the air-chamber; but if the air-chamber be punctured by some extraordinary chance the air-chamber being relatively small and the walls of the tube relatively thick, the walls of the air-chamber will contact before the tire can collapse materially, and thus enabling the tire to be used to return the vehicle or automobile to a station or stable. This is an additional feature of advantage possessed by my improved tire, since in the form of tire heretofore employed the air-chamber has been relatively large and when punctured the tire collapsed to such an extent that it was impossible to further move the automobile or vehicle without serious injury to the rim of the wheel and to the working parts owing to the jarring.

The motion-absorbing cushions $b^7$ and $b^9$ are preferably made of sponge rubber, although I do not limit myself to this material and may use rubber of any suitable character adapted to absorb longitudinal and lateral movements of the outer portions of the tire. Each cushion should be made of sufficient thickness to enable it to stretch between its outer and inner surfaces to absorb the various longitudinal and lateral movements liable to be imparted to it. The said movements are absorbed in part by the outer cushion $b^9$, and such as are not absorbed thereby are transmitted considerably reduced to the fabric tube $b^8$ and further absorbed by the inner cushion $b^7$. As a result I obtain a sufficiently thick and bulky wall to make the tire operative when punctured without sacrificing resilience and without liability of the several parts ripping apart under the strains to which they are subjected.

Having thus explained the nature of the invention and described a way of constructing and using the same, although without having attempted to set forth all of the forms in which it may be made or all of the modes of its use, I declare that what I claim is—

1. A tire comprising an inner yielding member confined and backed by an inner tube of reinforcing fabric, an exterior inclosing envelop composed of rubber facing backed and supported by an outer tube of reinforcing fabric, a motion-absorbing rubber cushion adjoining the inner fabric tube, a motion-absorbing rubber cushion adjoining the outer fabric tube, and an intermediate tube of reinforcing fabric between the said cushions, the said tubes being separately formed and the parts vulcanized together.

2. A tire comprising an inner yielding member formed with an air-chamber and a valve-stem integral with the walls of said air-chamber, said member being confined and backed by an inner tube of reinforcing fabric, an exterior inclosing envelop composed of a rubber facing backed and supported by an outer tube of reinforcing fabric, a motion-absorbing rubber cushion adjoining the inner fabric tube, a motion-absorbing rubber cushion adjoinining the outer fabric tube, and an intermediate tube of reinforcing fabric between the said cushions, the said tubes being separately formed and the parts vulcanized together.

3. A tire comprising an inner yielding member formed with an air-chamber, said member being confined and backed by an inner tube of reinforcing fabric, an exterior inclosing envelop composed of a rubber facing backed and supported by an outer tube of reinforcing fabric, a motion-absorbing rubber cushion adjoining the inner fabric tube, a motion-absorbing rubber cushion adjoining the outer fabric tube, and an intermediate tube of reinforcing fabric between the said cushions, the said tubes being separately
5 formed and the parts vulcanized together, the walls of said air-chamber being relatively near together so that in the event of a puncture the walls of the air-chamber will engage and permit the tire to be used, notwithstanding the puncture. 10

In testimony whereof I have affixed my signature in presence of two witnesses.

ELEAZER KEMPSHALL.

Witnesses:
 WILLIAM QUINBY,
 C. C. STECHER.